3,005,850
N-(N-SUBSTITUTED-AMINOALKYL)-
ALKANOYL ANILIDES

William B. Wright, Jr., Woodcliff Lake, N.J., assignor to American Cyanamid Company, New York, N.Y., a corporation of Maine
No Drawing. Filed Oct. 20, 1959, Ser. No. 847,451
7 Claims. (Cl. 260—562)

This invention relates to new organic compounds. More particularly, it relates to substituted alkylenediamine ethers and thioethers and methods of preparing the same.

The compounds of the present invention are active as analgesics and can be illustrated by the following general formula:

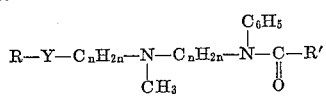

in which R is lower alkyl, benzyl, phenyl, lower alkoxyphenyl, halophenyl, lower alkanoylaminophenyl or lower alkylphenyl. Y is sulfur or oxygen, $n$ is an integer from 2 to 3 and R' is a lower alkyl radical and acid addition salts thereof.

The present compounds will form acid addition salts, which are generally crystalline solids. These salts can be, for example, derived from acids such as hydrochloric, nitric, sulfuric, picric and similar acids.

The compounds of the present invention are, in general, liquids at room temperature, which are relatively insoluble in water but soluble in most organic solvents.

The present compounds can be prepared by several different methods. A convenient method is by the acylation of the substituted alkylene diamine ethers with an acyl anhydride or acyl chloride. When the acylating agent is a liquid, the reaction can be carried out by heating with the substituted alkylenediamine ethers. The reaction can be conveniently carried out, for example, by heating on a steam bath for from 1 to 6 hours.

The compounds of the present invention can also be prepared by reacting in alkylene ether halide with an N-(methylamino-alkylene)-anilide which can be illustrated by the following equation:

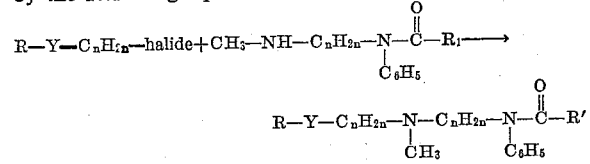

in which R, Y, $n$, and R' are as hereinbefore described. This reaction can be conveniently carried out by heating the reagents overnight in a solvent such as a lower alkanoic alcohol preferably in the presence of hydrohalic acid acceptors, such as pyridine, trimethylamine, sodium carbonate and the like.

A still further method of preparing compounds of the present invention is by reductive alkylation with an appropriate aldehyde of the general formula

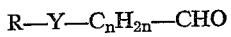

used in place of the halide in the equation above. This method is illustrated in Example IV hereinafter.

The present compounds are active analgesics when measured by the mouse hot plate method described by Wolfe and McDonald (J. Pharmacol. Exptl. Therap. 80, 300–307) with modifications. This test is conducted as follows.

The compounds to be tested are suspended in 2% aqueous starch and administered subcutaneously to a group of three mice at a dosage of 50 mg./kg. These mice are then individually placed upon the top enclosed surface of a copper bath maintained at 59° ±0.5° C. by a boiling acetone-ethyl acetate mixture. The response to this presumably painful heat stimulus is either a licking of the paws or an attempt to jump from the plate. The response time is measured four times for each mouse at fifteen minute intervals following administration. The criterion of analgesia is a 100% increase in response time over control. Established clinically active analgesics, such as Demerol, codeine, etc., are active in the above test.

When mixed with suitable excipients or diluents, they can be prepared as pills, capsules, tablets, powders, and the like for unit dosage and to simplify administration. As analgesics they will relieve pain by direct action on nerve centers or by diminishing the conductivity of the sensory nerve fibers.

The following examples are illustrative of the general methods of preparing the compounds.

EXAMPLE I

*Preparation of N-[2-(N-o-methoxyphenoxyethyl-N-methylamino)-propyl]-propionanilide*

A mixture of 27.8 parts of N-[2-(benzylmethylamino)-propyl]-propionanilide hydrochloride, 200 parts by volume of 90% ethanol, and 2 parts of 10% palladium on carbon catalyst is shaken in a Parr hydrogenator under about 3 atmospheres of hydrogen pressure until one molar equivalent of hydrogen is absorbed. The reaction mixture is filtered to remove the catalyst and concentrated to remove the solvent. The residue is made strongly alkaline with 5 N sodium hydroxide and the N-[2-(methylamino)-propyl]-propionanilide is extracted into ether. The ether extracts are dried over magnesium sulfate and concentrated to an oily residue. One hundred parts by volume of ethanol and 17.6 parts of o-methoxyphenoxyethylbromide are added and the solution is heated on the steam bath for 17 hours. The reaction mixture is concentrated to remove the solvent and diluted with 40 parts of water. The product is extracted into ether and distilled. A 68% yield of N-[2-(N-o-methoxyphenoxyethyl-N-methylamino)-propyl]-propionanilide, B.P. 182–186° C. (0.08 mm.) is obtained.

When one part of the above oil is mixed with 1.6 parts by volume of 1.7 N ethanolic hydrogen chloride and 10 ml. of ether, the hydrochloride salt separates. Recrystallization from ethanol by addition of ether yields pure N-[2 - (N - o - methoxyphenoxyethyl - N - methylamino)-propyl]-propionanilide hydrochloride, M.P. 118–120° C.

EXAMPLE II

*Preparation of N-[2-(N-methyl-N-phenoxypropylamino)-propyl]-propionanilide*

A mixture of 10 parts of $N^2$-methyl-$N^2$-phenoxypropyl-$N^1$-phenyl-1,2-propanediamine and 15 parts of propionic anhydride is heated on the steam bath for 3 hours and then distilled. N-[2-(N-methyl-N-phenoxypropylamino)-propyl]-propionanilide is collected at 175–180° C. (0.07 mm.).

EXAMPLE III

*Preparation of N-[2-(N-methyl-N-p-tolyloxyethylamino)-propyl]-propionanilide*

When p-tolyloxyethylbromide is substituted for o-methoxyphenoxyethylbromide in the procedure of Example I, N - [2-(N-methyl-N-p-tolyloxyethylamino) - propyl]-propionanilide, B.P. 173–178° C. (0.08 mm.), is obtained in 65% yield.

EXAMPLE IV

*Preparation of N-[2-(N-methyl-N-phenoxyethylamino)-propyl]-propionanilide*

A mixture of 13.6 parts of phenoxyacetaldehyde, 22.0 parts of N-[2-methylamino)propyl]-propionanilide, 100 parts of 95% ethanol and 1 part of 10% palladium-on-carbon catalyst is shaken in a Parr hydrogenator under a hydrogen pressure of about three atmospheres until hydrogen uptake is complete. The catalyst is filtered off and the reaction mixture is concentrated and distilled. N-[2-(N-methyl-N-phenoxyethylamino)-propyl] - propionanilide is collected at 166–172° C. (0.08 mm.).

EXAMPLE V

Preparation of N-[2-(N-ethoxyethyl-N-methylamino)-propyl]-propionanilide

This compound, B.P. 124–128° C. (0.08 mm.), is prepared by the method described in Example I, except that ethoxyethylbromide is substituted for o-methoxypenoxyethylbromide.

EXAMPLE VI

Preparation of N-[2-(N-benzyloxyethyl-N-methylamino)-propyl]-propionanilide

This compound is prepared by the method described in Example I except that benzyloxyethylbromide is substituted for o-methoxyphenoxyethylbromide.

EXAMPLE VII

Preparation of N-[2-(N-p-acetamidophenoxyethyl-N-methylamino)-propyl]-propionanilide This compound is prepared by the method described in Example I except that p-acetamidophenoxyethylbromide is substituted for o-methoxyphenoxyethylbromide.

EXAMPLE VIII

Preparation of N-[2-(N-m-chlorophenoxyethyl-N-methylamino)-propyl]-butyranilide

This compound is obtained when a mixture of 10 parts of $N^2$ - m - chlorophenoxyethyl-$N^2$-methyl-$N^1$-phenyl-1,2-propanediamine and 15 parts of butyric anhydride is heated on the steam bath for 3 hours and then distilled.

EXAMPLE IX

Preparation of N-[2-(N-p-bromophenoxyethyl-N-methylamino)-propyl]-propionanilide This compound is obtained when a mixture of 10 parts of $N^2$ - p - bromophenoxyethyl-$N^2$-methyl-$N^1$-phenyl-1,2-propanediamine and 15 parts of propionic anhydride is heated on the steam bath for 3 hours and then distilled.

EXAMPLE X

Preparation of N-[2-(N-p-ethylphenoxyethyl-N-methylamino)-1-methylethyl]-acetanilide This compound is obtained when a mixture of 10 parts of $N^1$ - p - ethylphenoxyethyl-$N^1$-methyl-$N^2$-phenyl-1,2-propanediamine and 15 parts of acetic anhydride is heated on the steam bath for 3 hours and distilled.

EXAMPLE XI

Preparation of N-[2-(N-methyl-N-phenylmercaptoethylamino)-ethyl]-propionanilide

This compound is obtained when 10 parts of $N^1$-methyl-$N^1$ - phenylmercaptoethyl - $N^2$ - phenylethylenediamine and 15 parts of propionic anhydride is heated on the steam bath for 3 hours and distilled.

EXAMPLE XII

Preparation of N-[2-(N-methyl-N-phenylmercaptoethylamino)-propyl]-propionanilide This compound is obtained when phenylmercaptoethylbromide is substituted for o-methoxyphenoxyethylbromide in the procedure of Example I.

I claim:

1. A compound of the group consisting of those having the formula:

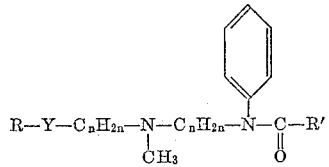

wherein R is a member of the group consisting of lower alkyl, benzyl, phenyl, lower alkoxyphenyl, halophenyl lower alkanoylaminophenyl and lower alkylphenyl radicals, Y is a member of the group consisting of sulfur and oxygen, n is an integer from 2 to 3, R' is a lower alkyl radical and nontoxic therapeutic acid addition salts thereof.

2. A compound having the formula:

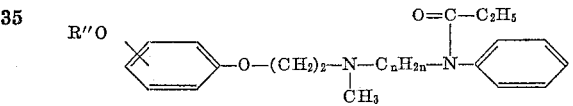

wherein R'' is a lower alkyl radical and n is an integer from 2 to 3.

3. The compound of N-[2-(N-o-methoxyphenoxyethyl-N-methylamino)-propyl]-propionanilide.

4. The compound N-[2-(N-methyl-N-phenoxypropylamino)-propyl]-propionanilide.

5. The compound N-[2-(N-methyl-N-p-tolyloxyethylamino)-propyl]-propionanilide.

6. The compound N - [2-(N-methyl-N-phenoxyethylamino)-propyl]-propionanilide.

7. The compound N - [2 - (N-ethoxyethyl-N-methylamino)-propyl]-propionanilide.

References Cited in the file of this patent

Sidgwick: "Organic Chemistry of Nitrogen," Clarendon Press (Oxford), pages 13–14 (1937).

Degering: "An Outline of Organic Nitrogen Compounds," University Lithoprinters (Ypsilanti, Mich.), pages 203, 397, 398 (1950).